United States Patent
Miller et al.

(10) Patent No.: US 11,906,386 B2
(45) Date of Patent: Feb. 20, 2024

(54) WHEEL BALANCING TOOL

(71) Applicant: Nissan North America, Inc., Franklin, TN (US)

(72) Inventors: Adam Miller, Novi, MI (US); Eric Cohen, Novi, MI (US)

(73) Assignee: Nissan North America Inc., Franklin, TN (US)

( * ) Notice: Subject to any disclaimer, the term of this patent is extended or adjusted under 35 U.S.C. 154(b) by 1462 days.

(21) Appl. No.: 16/228,694

(22) Filed: Dec. 20, 2018

(65) Prior Publication Data

US 2020/0200639 A1 Jun. 25, 2020

(51) Int. Cl.
*G01M 1/32* (2006.01)
*F16F 15/32* (2006.01)
*F16F 15/34* (2006.01)

(52) U.S. Cl.
CPC .......... *G01M 1/326* (2013.01); *F16F 15/324* (2013.01); *F16F 15/345* (2013.01); *F16F 2230/0029* (2013.01); *F16F 2230/0047* (2013.01)

(58) Field of Classification Search
CPC ...... G01M 1/326; F16F 15/324; F16F 15/345; F16F 2230/0029; F16F 2230/0047
See application file for complete search history.

(56) References Cited

U.S. PATENT DOCUMENTS

| | | | | |
|---|---|---|---|---|
| 451,053 A * | 4/1891 | Jackman | | G01B 5/255 33/838 |
| 2,237,501 A * | 4/1941 | Purvis | | F16F 15/324 301/5.21 |
| 2,469,997 A * | 5/1949 | Simpson | | F16F 15/324 301/5.21 |
| 3,056,631 A * | 10/1962 | Mills | | F16F 15/324 301/5.21 |
| 3,088,214 A * | 5/1963 | Bennett | | G01B 5/255 33/203.15 |
| 4,221,054 A * | 9/1980 | Schaevitz | | G01B 3/14 33/563 |
| 4,502,328 A | 3/1985 | Wood et al. | | |
| 5,733,016 A * | 3/1998 | Brown | | F16F 15/324 301/5.21 |

(Continued)

FOREIGN PATENT DOCUMENTS

WO 2006059314 A2 6/2006

OTHER PUBLICATIONS

JP-11325188-A, Sugayachi et al., "Counter Weight Attachment Structure for Tires of Motor Vehicle", Nov. 1999. (Year: 1999).*

(Continued)

*Primary Examiner* — John Fitzgerald
*Assistant Examiner* — Tania Courson
(74) *Attorney, Agent, or Firm* — Global IP Counselors, LLP (57) ABSTRACT

A wheel balancing tool includes a body member, an attachment member and an alignment member. The body member includes a notch configured to be aligned with a balancing mark on a rim of a vehicle wheel. The attachment member is connected to the body member. The attachment member includes at least one hook configured to attach the tool to the wheel rim. The alignment member extends outwardly from the body portion and is configured to indicate an attachment position on the wheel for a balancing weight.

19 Claims, 13 Drawing Sheets

(56) References Cited

U.S. PATENT DOCUMENTS

| | | | |
|---|---|---|---|
| 6,952,964 B2 | 10/2005 | Gerdes et al. | |
| 7,497,113 B1 * | 3/2009 | Patel | G01M 17/02 |
| | | | 73/146 |
| 7,882,738 B2 | 2/2011 | Carpenter et al. | |
| 7,883,156 B2 * | 2/2011 | Pursley | F16F 15/345 |
| | | | 301/5.21 |
| 9,341,231 B2 * | 5/2016 | Prevost | F16F 15/324 |
| D774,872 S * | 12/2016 | Prevost | D8/349 |
| 10,024,387 B2 * | 7/2018 | McMahon | F16F 15/345 |
| 2005/0062331 A1 * | 3/2005 | Zank | F16F 15/324 |
| | | | 301/5.21 |
| 2007/0126278 A1 * | 6/2007 | Baek | F16F 15/324 |
| | | | 301/5.21 |
| 2010/0007194 A1 * | 1/2010 | Zank | F16F 15/345 |
| | | | 301/5.21 |
| 2011/0204704 A1 * | 8/2011 | Halle | F16F 15/324 |
| | | | 228/103 |
| 2011/0260521 A1 * | 10/2011 | Watkin | F16F 15/324 |
| | | | 301/5.21 |
| 2014/0245623 A1 * | 9/2014 | Olesky | G01B 5/255 |
| | | | 33/203 |

OTHER PUBLICATIONS

JP-11063111-A, Nakamura, "Balancing Weight", Mar. 1999. (Year: 1999).*

* cited by examiner

FIG. 20 i# WHEEL BALANCING TOOL

BACKGROUND

Field of the Invention

The present invention generally relates to a wheel balancing tool to facilitate balancing vehicle wheels. More specifically, the present invention relates to a wheel balancing tool configured to be connected to a rim of a vehicle wheel to indicate an attachment position for a balancing weight.

Background Information

When balancing a vehicle wheel with a balance machine, a mark is made by the balance machine on an inboard lip near an inboard rim of the wheel. A worker must then visually extrapolate an axial line from the position of the mark on the inboard lip to an attachment position on an inner surface of a barrel near an outboard rim of the wheel. The worker installs a balancing weight at the attachment position, which is where the axial line is visually extended to the attachment position.

The inboard lip and the attachment position on the inner barrel surface are on two different planes of the vehicle wheel such that visually extending the machine-made mark can result in an inexact determination of the attachment position for the balancing weight. Visually extending the axial line from the mark made by the balancing machine to determine the attachment position can result in the balancing weight being attached in an incorrect position, thereby resulting in an improperly balanced wheel. An imbalanced wheel can cause vibration of the wheel, thereby requiring the wheel to be balanced again. Accordingly, a need exists for a wheel balancing tool that facilitates proper positioning of the balancing weight on the vehicle wheel.

SUMMARY

An object of the disclosure is to provide a wheel balancing tool configured to be connected to a rim of a vehicle wheel to indicate an attachment position for a balancing weight.

In view of the state of the known technology, one aspect of the present disclosure is to provide a wheel balancing tool including a body member, an attachment member and an alignment member. The body member includes a notch configured to be aligned with a balancing mark on a rim of a vehicle wheel. The attachment member is connected to the body member. The attachment member includes at least one hook configured to attach the tool to the wheel rim. The alignment member extends outwardly from the body portion and is configured to indicate an attachment position on the wheel for a balancing weight.

Also other objects, features, aspects and advantages of the disclosed wheel balancing tool will become apparent to those skilled in the art from the following detailed description, which, taken in conjunction with the annexed drawings, discloses exemplary embodiments of the wheel balancing tool.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Referring initially to FIGS. 1-8, a wheel balancing tool 10 is illustrated in accordance with a first exemplary embodiment of the present invention. The wheel balancing tool 10 is configured to be connected to a rim 12 of a vehicle wheel 14 to indicate an attachment position for a balancing weight 16. The wheel balancing tool 10 includes a body member 18, an attachment member 20 and an alignment member 22. The body member 18 includes a notch 24 configured to be aligned with a balancing mark 26 made on the rim 12 of the vehicle wheel 14 by a balancing machine during wheel balancing. The attachment member 20 is connected to the body member 18. The attachment member 20 includes at least one hook 42 configured to attach the wheel balancing tool 10 to the wheel rim 12. The alignment member 22 extends outwardly from the body member 18 and is configured to indicate an attachment position on the wheel 14 for the balancing weight 16.

Figure 3:
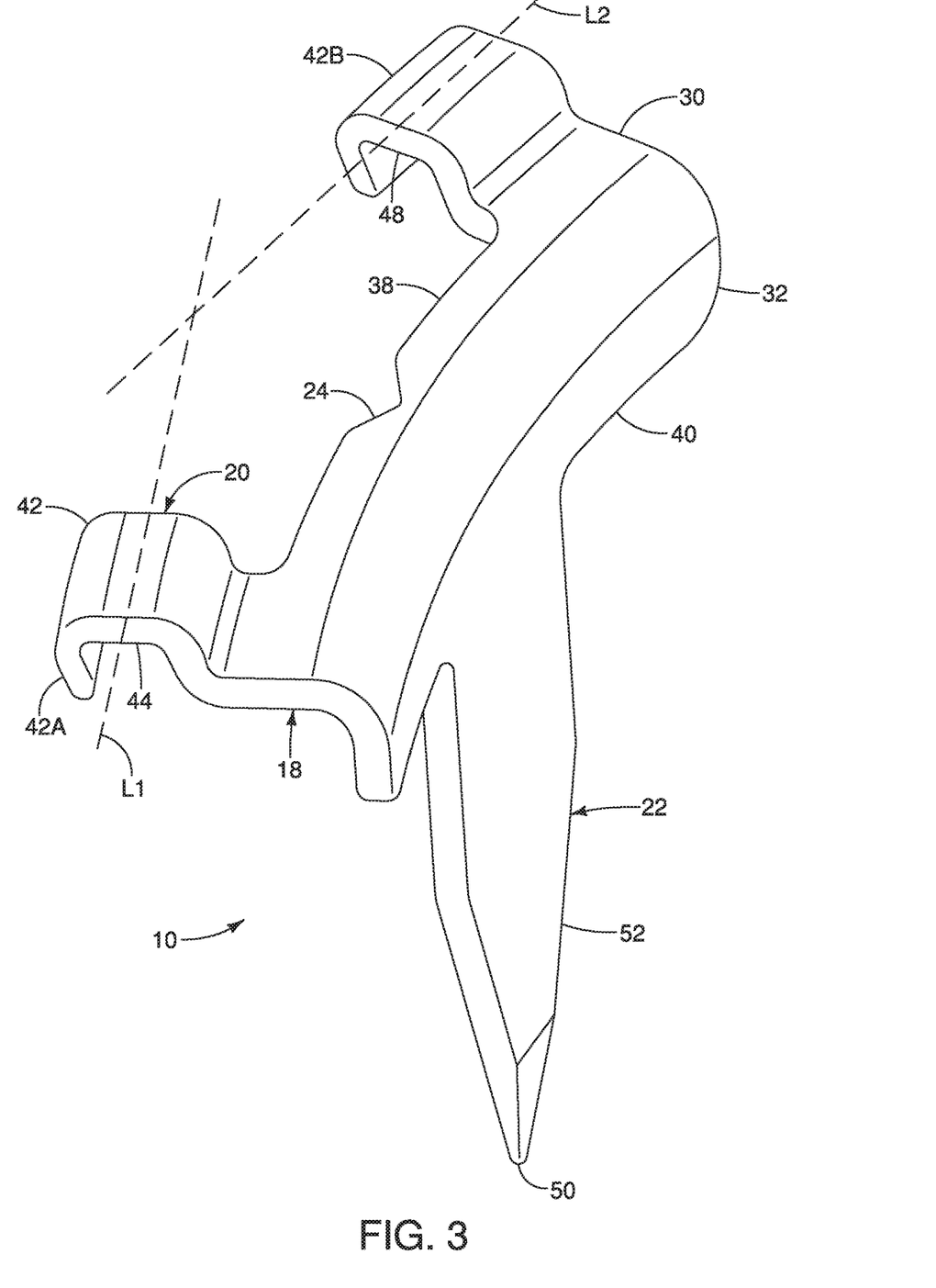
FIG. 3 is a perspective view of the wheel balancing tool of FIG. 1.
Figure 4:
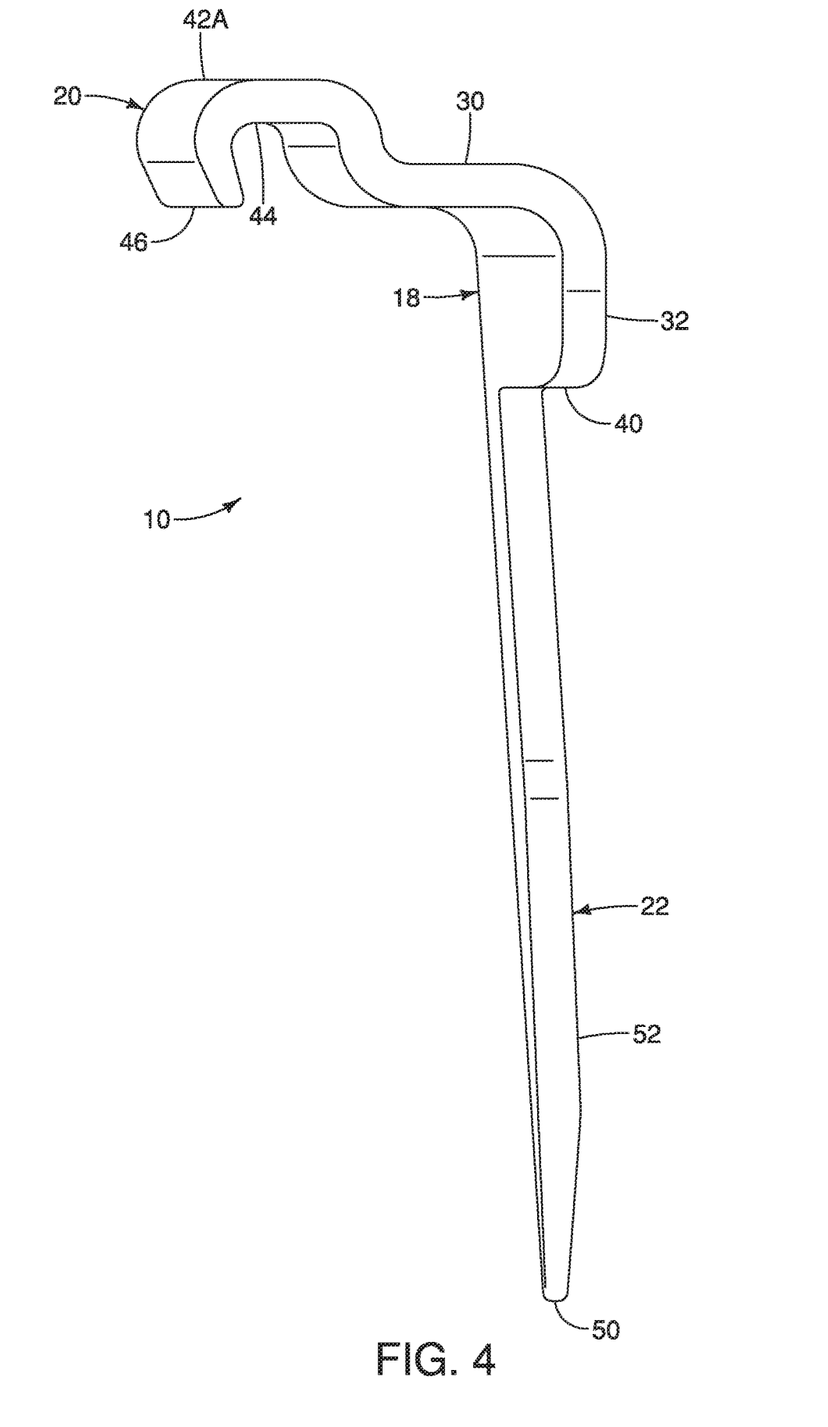
FIG. 4 is a side elevational view of the wheel balancing tool of FIG. 3.

The body member 18 has a first body portion 30 and a second body portion 32, as shown in FIGS. 3 and 4. The first body portion 30 is disposed in a first plane, and the second body portion 32 is disposed in a second plane. The second plane is non-coplanar with the first plane. Preferably, as shown in FIG. 3, the first body portion 30 is substantially perpendicular to the second body portion 32. The body member 18 is curved to facilitate being received by vehicle wheel 14 and positioned adjacent an inner surface 34 of a barrel 36 of the vehicle wheel 14.

Figure 5:
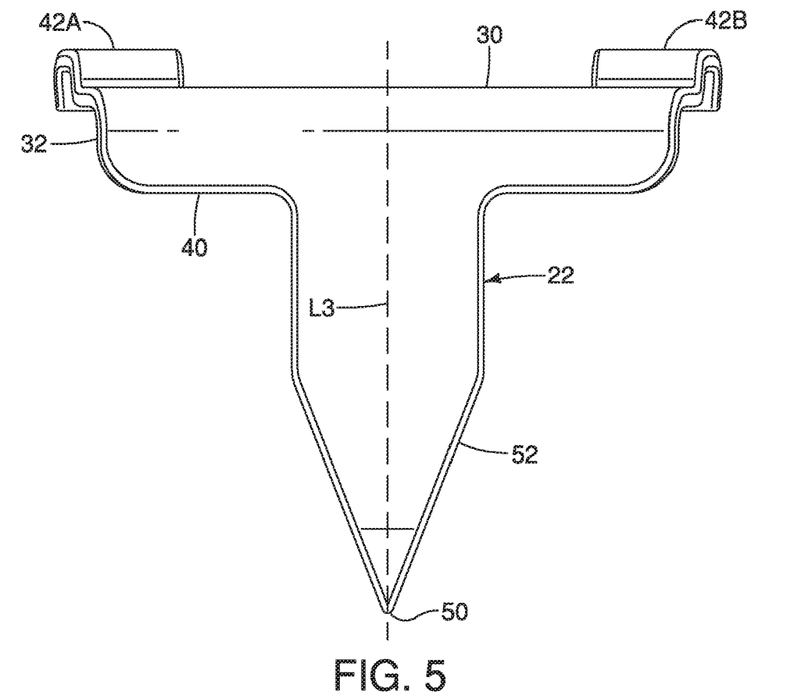
FIG. 5 is a front elevational view of the wheel balancing tool of FIG. 3.
Figure 6:
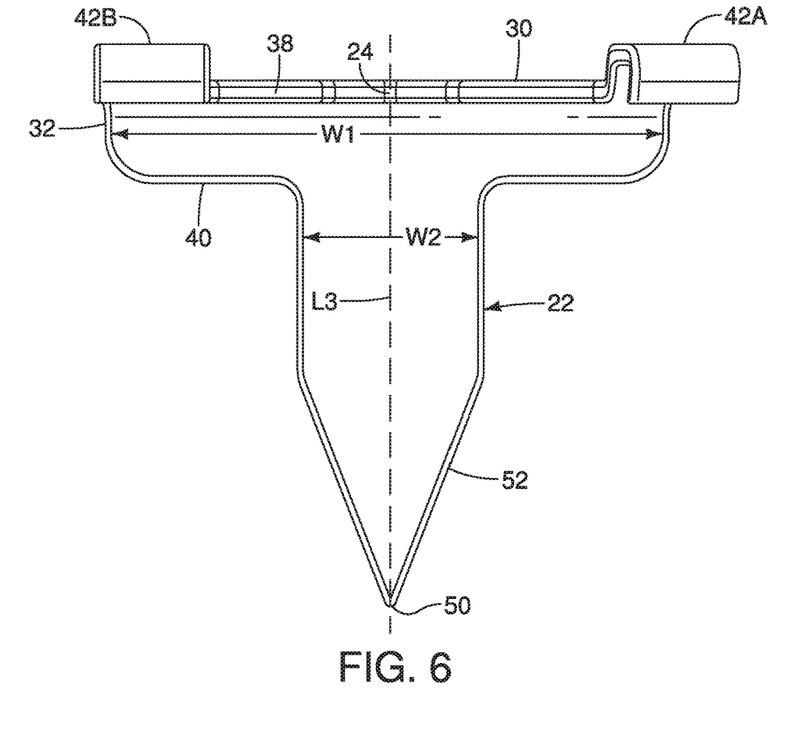
FIG. 6 is a rear elevational view of the wheel balancing tool of FIG. 3.

The first body portion 30 of the body member 18 has a first edge 38 and the second body portion of the body member 18 has a second edge 40, as shown in FIGS. 3, 5 and 6. The attachment member 20 extends from the first edge 38, and the alignment member 22 extends from the second edge 40.

Figure 1:
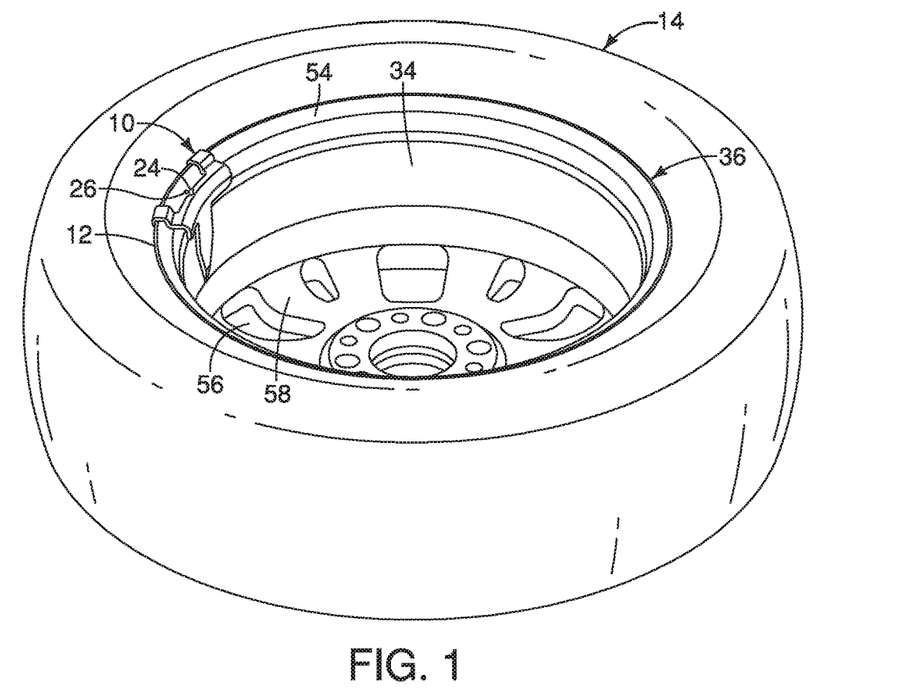
FIG. 1 is a perspective view of a wheel balancing tool in accordance with an exemplary embodiment of the present invention connected to a vehicle wheel before a balancing weight is added to the vehicle wheel.
Figure 2:
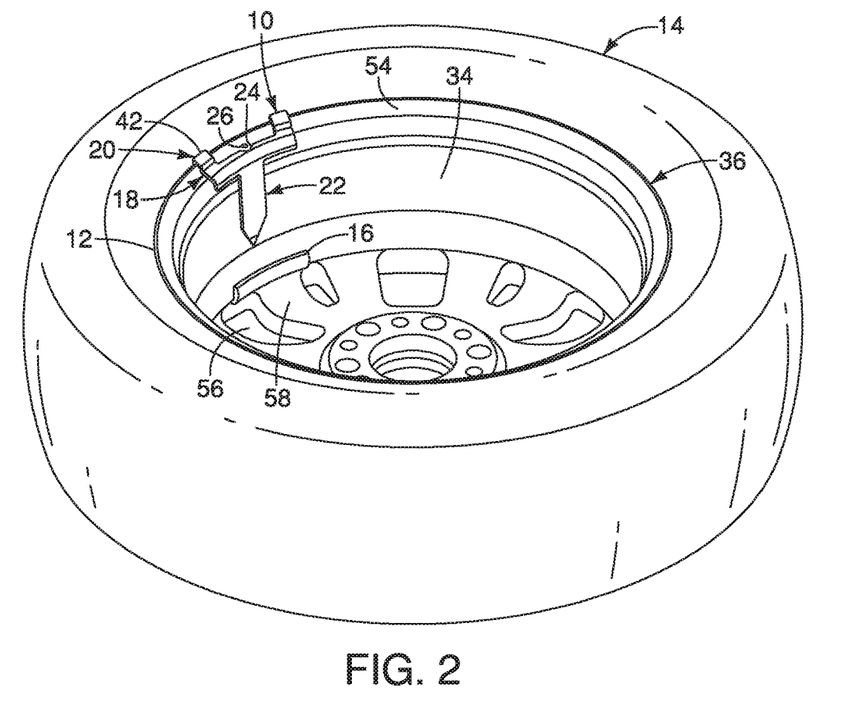
FIG. 2 is a perspective view of the wheel balancing tool of FIG. 1 connected to a vehicle wheel to which a balancing weight is added.
Figure 7:
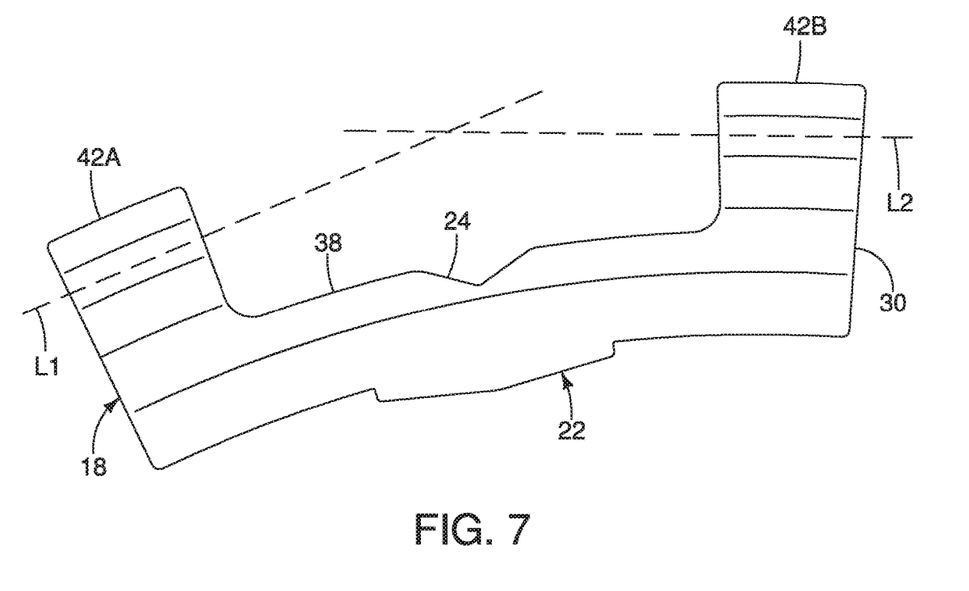
FIG. 7 is a top plan view of the wheel balancing tool of FIG. 3.

The notch 24 is formed in the first edge 38 of the first body portion 30 of the body member 18, as shown in FIGS. 3 and 7. The notch 24 is substantially V-shaped, although any suitable shape can be used to facilitate aligning the balancing tool 10 with the balancing mark 26, as shown in FIGS. 1 and 2.

The attachment member 20 includes at least one hook 42 extending from the first edge 38 of the first body portion 30 of the body member 18, as shown in FIG. 3. Preferably, the attachment member 20 includes two hooks 42A and 42B, as shown in FIGS. 2 and 3. Preferably, the first and second hooks 42A and 42B are substantially identical. The hook 42A includes a recessed portion 44 configured to engage the rim 12 of the vehicle wheel 14. A free end 46 of the hook 42A extends toward the alignment member 22, as shown in FIG. 4. A first longitudinal centerline L1 through a first recessed portion 44 of the first hook 42A and a second longitudinal centerline L2 through a second recessed portion 48 of the second hook 42B are linearly offset, when viewed from above in FIGS. 3 and 7, to facilitate engaging the wheel balancing tool 10 with the circumferential rim 12 of the vehicle wheel 14. The first hook 42A and the second hook 42B are spaced apart such that the notch 24 is disposed between the first hook 42A and the second hook 42B.

Figure 8:
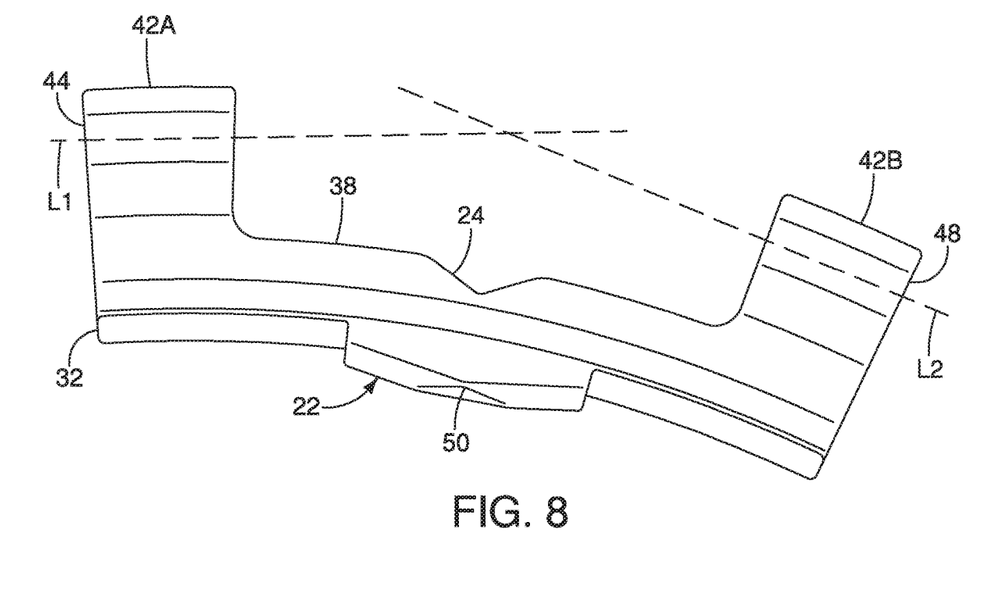
FIG. 8 is a bottom plan view of the wheel balancing tool of FIG. 3.

The alignment member 22 extends from the second edge 40 of the second body portion 32 of the body member 18, as shown in FIGS. 3-6. The alignment member 22 extends in a direction away from the body member 18. The alignment member 22 preferably has a pointed tip 50 that indicates the attachment position at which the balancing weight 16 is to be added. The alignment member 22 shown in FIGS. 3, 5 and 6 has a tapered portion 52 that tapers inwardly to the pointed tip 50. As shown in FIGS. 6 and 8, the notch 24 of the body member 18 is aligned with the pointed tip 50 of the alignment member 22 to facilitate determining the attachment position at which the balancing weight 16 is to be added. As shown in FIG. 6, the notch 24 and the pointed tip 50 are disposed on a centerline L3 of the wheel balancing tool 10.

The wheel balancing tool 10 is preferably integrally formed as a one-piece member, as shown in FIGS. 1-8. The wheel balancing tool 10 is preferably made of plastic, such as a thermoplastic polymer (e.g., acrylonitrile butadiene styrene (ABS) plastic), to substantially prevent damaging or otherwise marring a surface treatment of the vehicle wheel 14 when connected to or removed therefrom. Alternatively, the wheel balancing tool 10 can be made of any suitable material.

As shown in FIG. 1, the vehicle wheel 14 is horizontally disposed on the wheel balancing machine (not shown) for the wheel balancing procedure. Following the wheel balancing procedure, the wheel balancing machine applies the balancing mark 26, such as an indicator light, to an inboard rim flange 54 of the vehicle wheel 14 to indicate the circumferential attachment position for the balancing weight 16. The wheel balancing tool 10 is attached to the inboard rim 12 of the vehicle wheel 14 such that the center of the notch 24 is aligned with the balancing mark 26. The recessed portions 44 and 48 of the first and second hooks 42A and 42B engage the inboard rim 12 to secure the wheel balancing tool 10 to the vehicle wheel 14. The first and second hooks 42A and 42B being linearly offset (as shown in FIGS. 3, 7 and 8) and the curved shape of the body member 18 facilitate accommodating the rim 12 of the vehicle wheel 14.

As shown in FIG. 1, the alignment member 22 extends in an axial direction of the vehicle wheel 14 along the inner surface 34 of the barrel 36. The pointed tip 50 of the alignment member 22 indicates the attachment position for the balancing weight 16, as shown in FIGS. 1 and 2. The notch 24 is aligned with the balancing mark 26 on the inboard flange 34 of the inboard rim 12 (the first plane) and the alignment member 22 extends along the inner surface 34 of the barrel 36 (the second plane), thereby removing unnecessary visualization of the attachment position and ensuring the balancing weight 16 is accurately attached to the vehicle wheel to ensure proper balancing of the wheel 14.

As shown in FIGS. 5 and 6, a first width W1 of the body member 18 is larger than a second width W2 of the alignment member 22. Preferably, the first width W1 of the body member 18 is larger than a width of an opening 56 between spokes 58 of the vehicle wheel 14 to substantially prevent the wheel balancing tool 10 from accidentally falling between the spokes 58 of the vehicle wheel 14 and into the wheel balancing machine, which is disposed beneath the horizontally positioned vehicle wheel 14 during the wheel balancing procedure.

Second Exemplary Embodiment

As shown in FIGS. 9-16, a wheel balancing tool 110 in accordance with another illustrated exemplary embodiment of the present invention is substantially similar to the wheel balancing tool 10 of the exemplary embodiment illustrated in FIGS. 1 to 8 except for the differences described below. Similar parts are identified with similar reference numerals, except increased by 100 (i.e., 1xx, accordingly).

Referring to FIGS. 9-16, the wheel balancing tool 110 is configured to be connected to a rim 112 of a vehicle wheel 114 to indicate an attachment position for a balancing weight 116. The wheel balancing tool 110 includes a body member 118, an attachment member 120 and an alignment member 122. The body member 118 includes a notch 124 configured to be aligned with a balancing mark 126 made on the rim 112 of the vehicle wheel 114 by a balancing machine during wheel balancing. The attachment member 120 is connected to the body member 118. The attachment member 120 includes a hook 128 configured to attach the wheel balancing tool 110 to the wheel rim 112. The alignment member 122 extends outwardly from the body member 118 and is configured to indicate an attachment position on the wheel 114 for the balancing weight 116.

Figure 12:
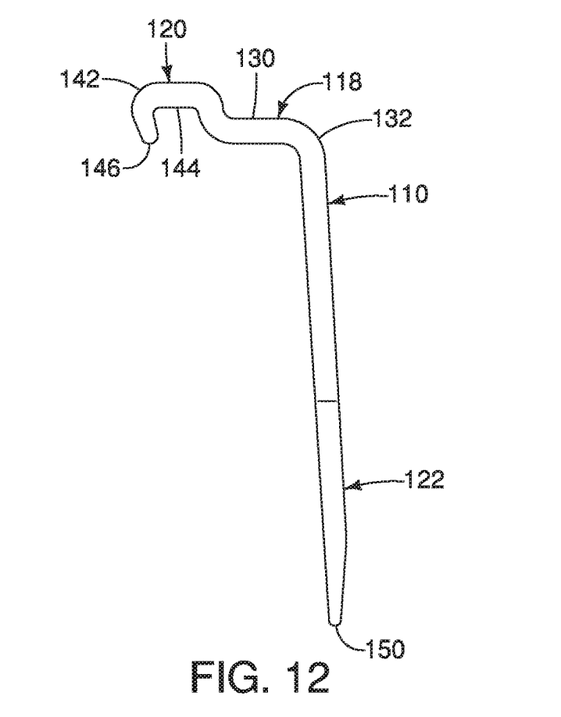
FIG. 12 is a side elevational view of the wheel balancing tool of FIG. 11.
Figure 13:
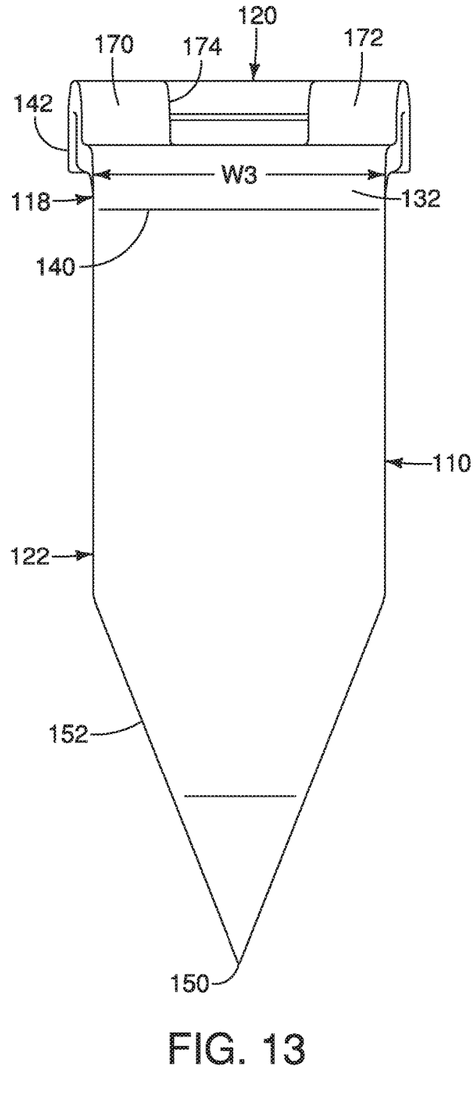
FIG. 13 is a front elevational view of the wheel balancing tool of FIG. 11.
Figure 14:
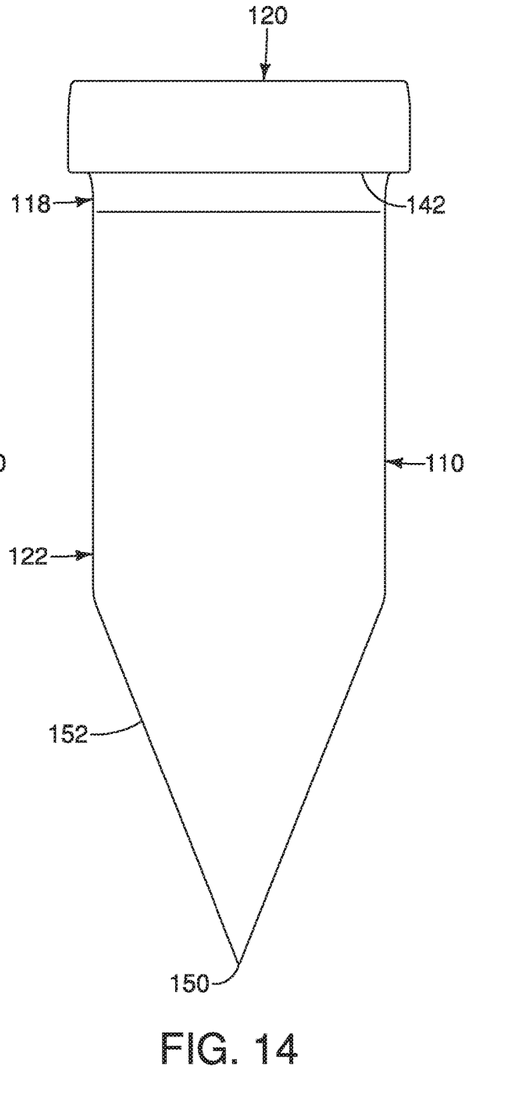
FIG. 14 is a rear elevational view of the wheel balancing tool of FIG. 11.

The body member 118 has a first body portion 130 and a second body portion 132, as shown in FIGS. 12-14. The first body portion 130 is disposed in a first plane, and the second body portion 132 is disposed in a second plane. The second plane is non-coplanar with the first plane. Preferably, as shown in FIG. 12, the first body portion 130 is substantially perpendicular to the second body portion 132. The body member 118 is curved to facilitate being received by vehicle wheel 114 and positioned adjacent an inner surface 134 of a barrel 136 of the vehicle wheel 114.

Figure 15:
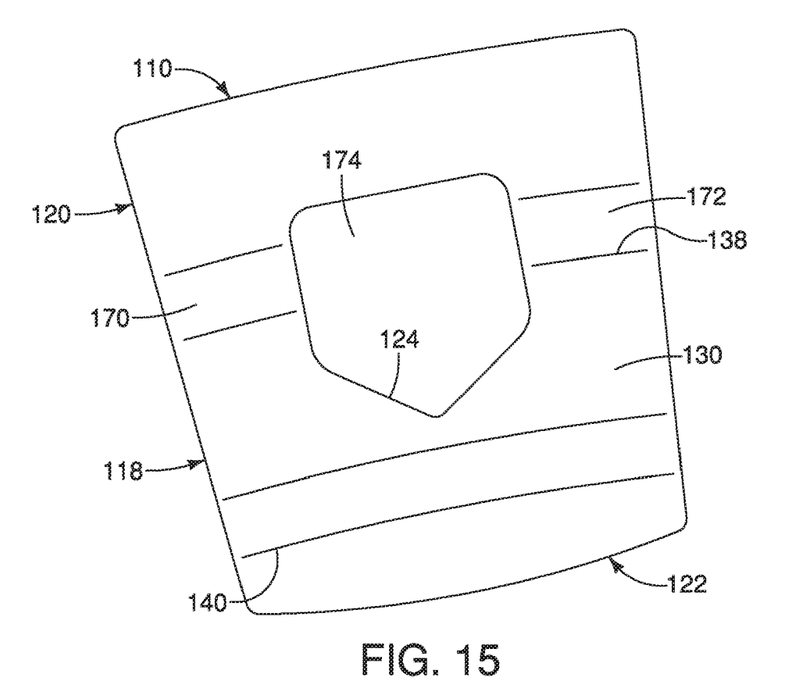
FIG. 15 is a top plan view of the wheel balancing tool of FIG. 11.

The first body portion 130 of the body member 118 has a first edge 138 and the second body portion 132 of the body member 118 has a second edge 140, as shown in FIGS. 13-15. The attachment member 120 extends from the first edge 138, and the alignment member 122 extends from the second edge 140.

Figure 9:
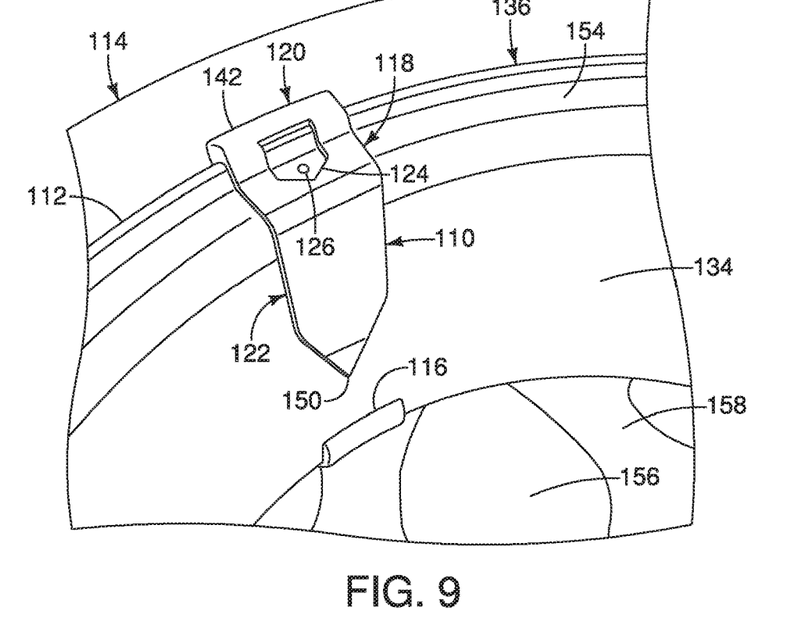
FIG. 9 is a perspective view of a wheel balancing tool in accordance with another exemplary embodiment of the present invention connected to a vehicle wheel and to which a balancing weight is added.
Figure 10:
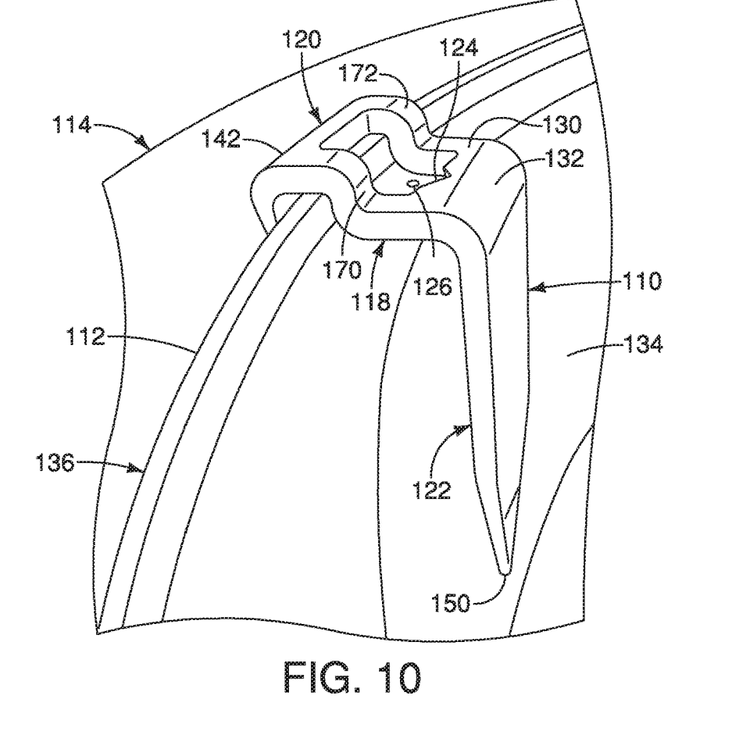
FIG. 10 is a perspective view of the wheel balancing tool of FIG. 9 connected to a vehicle wheel.
Figure 11:
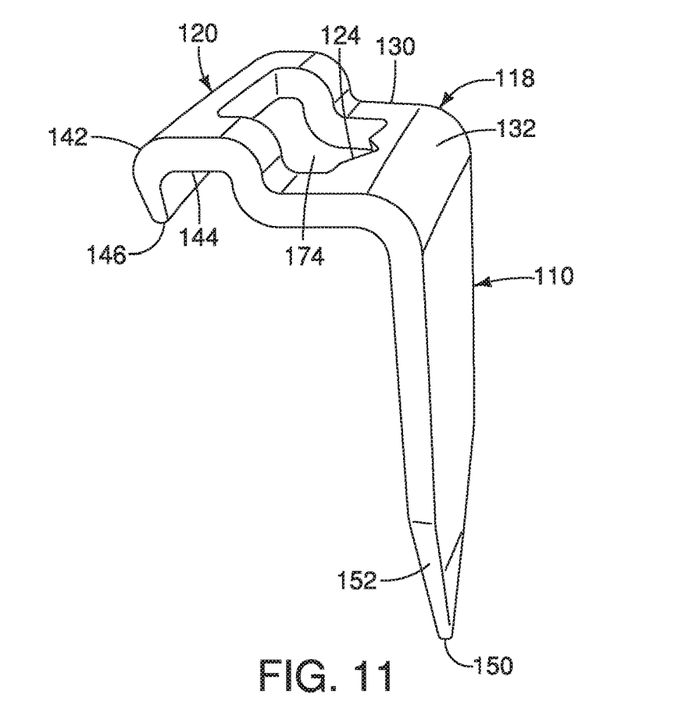
FIG. 11 is a perspective view of the wheel balancing tool of FIG. 9.

The notch 124 is formed in the first edge 138 of the first body portion 130 of the body member 118, as shown in FIGS. 9, 10, 15 and 16. The notch 124 is substantially V-shaped, although any suitable shape can be used to facilitate aligning the balancing tool 110 with the balancing mark 126, as shown in FIGS. 9 and 10.

Figure 16:
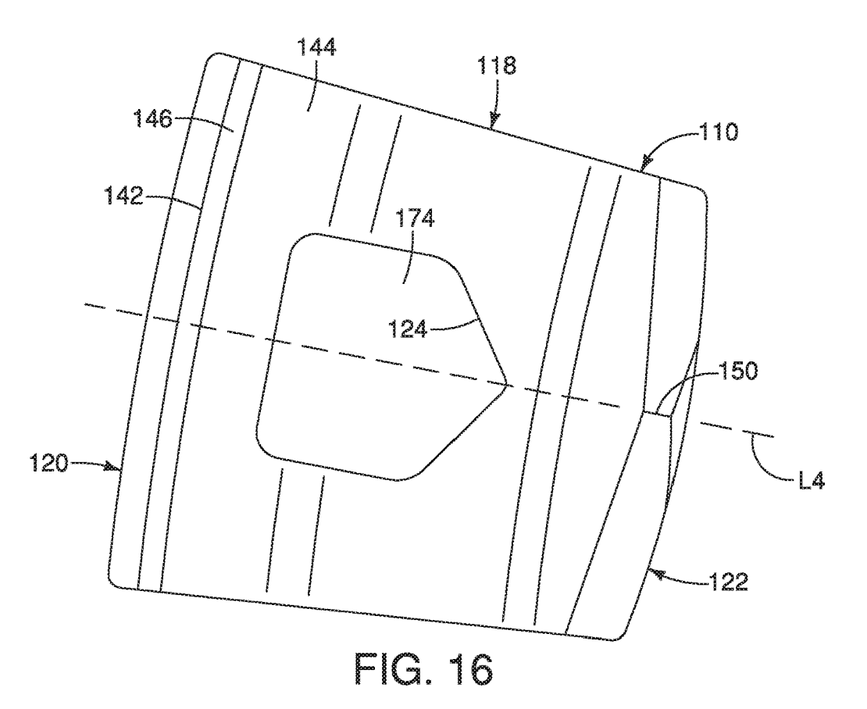
FIG. 16 is a bottom plan view of the wheel balancing tool of FIG. 11.

The attachment member 120 includes a hook 142 extending from the first edge 138 of the first body portion 130 of the body member 118, as shown in FIGS. 9 and 15. The hook 142 includes a recessed portion 144 configured to engage the rim 112 of the vehicle wheel 114. A free end 146 of the hook 142 extends toward the alignment member 122, as shown in FIG. 12. The hook 142 is curved, as shown in FIG. 16, to facilitate connecting to the wheel rim 112. Preferably, the curvature of the hook 142 is substantially similar to the curvature of the wheel rim 112 to facilitate engaging the wheel rim 112.

The attachment member 120 includes a first connecting arm 170 and a second connecting arm 172 extending between the first body portion 130 of the body member 118 and the hook 142, as shown in FIGS. 10, 13 and 15. As shown FIGS. 10 and 15, the first and second connecting arms 170 and 172, the hook 142, and the body member 118 define an open space 174. The open space 174 is entirely surrounded by the wheel balancing tool 110, as shown in FIGS. 9, 10, 15 and 16. The notch 124 is disposed in a portion of the body member 118 defining the open space 174. As shown in FIGS. 9 and 10, the balancing mark 126 is positioned within the open space 174 when the balancing tool 110 is connected to the vehicle rim 112.

The alignment member 122 extends from the second edge 140 of the second body portion 132 of the body member 118, as shown in FIG. 13. The alignment member 122 extends in a direction away from the body member 118. The alignment member 122 preferably has a pointed tip 150 that indicates the attachment position at which the balancing weight 116 is to be added, as shown in FIG. 10. The alignment member 122, as shown in FIGS. 13 and 14, has a tapered portion 152 that tapers inwardly to the pointed tip 150. As shown in FIG. 16, the notch 124 of the body member 118 is aligned with the pointed tip 150 of the alignment member 122 to facilitate determining the attachment position at which the balancing weight 116 is to be added. As shown in FIG. 16, the notch 124 and the pointed tip 150 are disposed on a centerline L4 of the wheel balancing tool 110.

The wheel balancing tool 110 is preferably integrally formed as a one-piece member, as shown in FIGS. 9-16. The wheel balancing tool 110 is preferably made of plastic, such as a thermoplastic polymer (e.g., acrylonitrile butadiene styrene (ABS) plastic), to substantially prevent damaging or otherwise marring a surface treatment of the vehicle wheel 114 when connected to or removed therefrom. Alternatively, the wheel balancing tool 110 can be made of any suitable material.

As shown in FIG. 9, the vehicle wheel 114 is horizontally disposed on the wheel balancing machine (not shown) for the wheel balancing procedure. Following the wheel balancing procedure, the wheel balancing machine applies the balancing mark 126, such as an indicator light, to an inboard rim flange 154 of the vehicle wheel 114 to indicate the circumferential attachment position for the balancing weight 116. The wheel balancing tool 110 is attached to the inboard rim 112 of the vehicle wheel 114 such that the center of the notch 124 is aligned with the balancing mark 126. The recessed portion 144 of the hook 142 engages the inboard rim 112 to secure the wheel balancing tool 110 to the vehicle wheel 114. The curved shape of the hook 142 and the curved shape of the body member 118 facilitate accommodating the rim 112 of the vehicle wheel 114.

As shown in FIGS. 9 and 10, the alignment member 122 extends in an axial direction of the vehicle wheel 114 along the inner surface 134 of the barrel 136. The pointed tip 150 of the alignment member 122 indicates the attachment position for the balancing weight 116. The notch 124 is aligned with the balancing mark 126 on the inboard rim flange 154 of the inboard rim 112 (the first plane) and the alignment member 122 extends along the inner surface 134 of the barrel 136 (the second plane), thereby removing unnecessary visualization of the attachment position and ensuring the balancing weight 116 is accurately attached to the vehicle wheel 114 to ensure proper balancing of the wheel 114.

As shown in FIGS. 9 and 13, a width W3 of the body member 118 is preferably larger than a width of an opening 156 between spokes 158 of the vehicle wheel 114 to substantially prevent the wheel balancing tool 110 from accidentally falling between the spokes 158 of the vehicle wheel 114 and into the wheel balancing machine, which is disposed beneath the horizontally positioned vehicle wheel 114 during the wheel balancing procedure.

Other Exemplary Embodiments

Figure 17A:
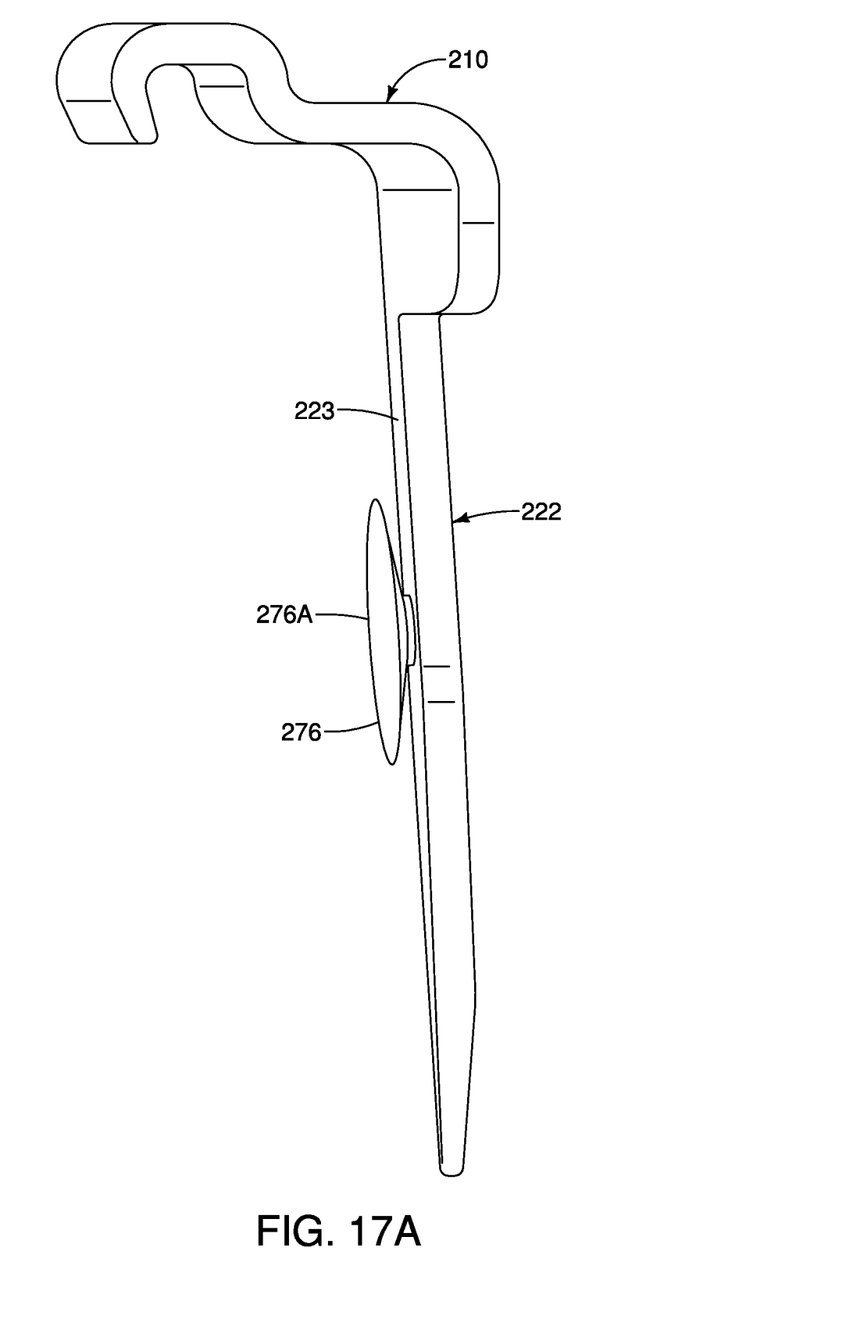
FIG. 17A is a side elevational view of the wheel balancing tool of FIG. 4 modified to have a suction cup to facilitate retention by the vehicle wheel.
Figure 17B:
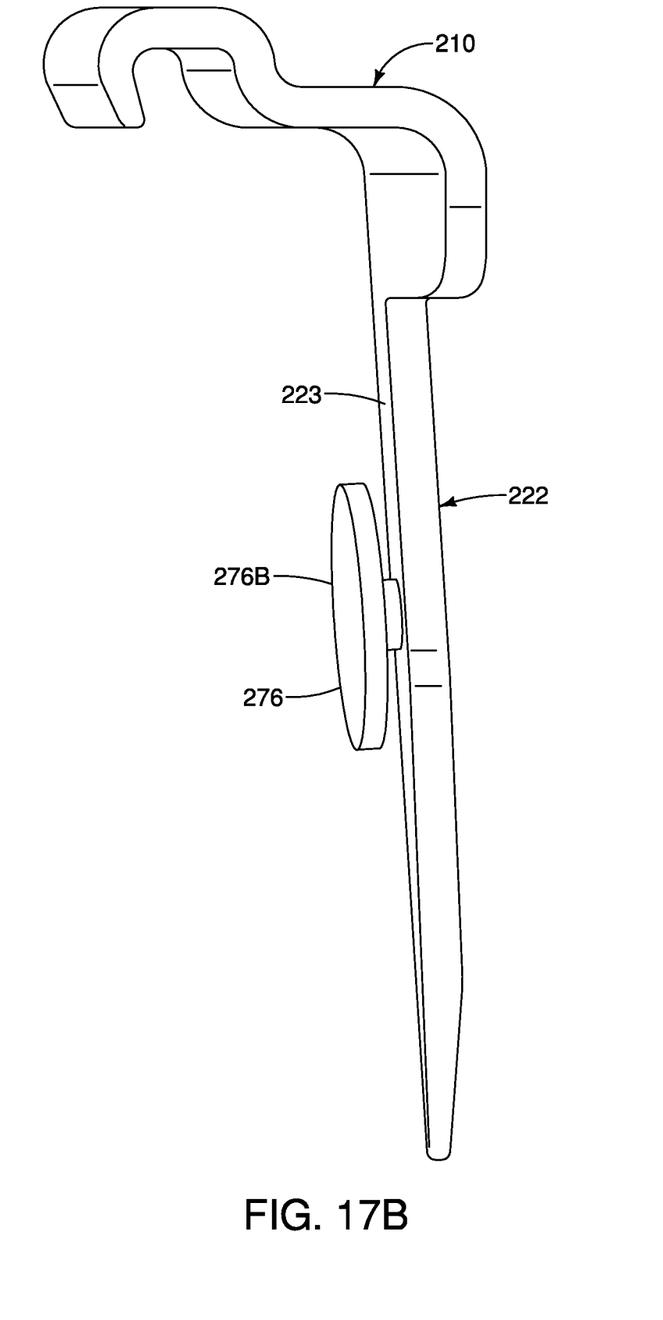
FIG. 17B is a side elevational view of the wheel balancing tool of FIG. 4 modified to have a magnet to facilitate retention by the vehicle wheel.

As shown in FIG. 17, a wheel balancing tool 210 in accordance with another illustrated exemplary embodiment of the present invention is substantially similar to the wheel balancing tool 10 of the exemplary embodiment illustrated in FIGS. 1 to 8 except for the differences described below. Similar parts are identified with similar reference numerals, except increased by 200 (i.e., 2xx, accordingly).

As shown in FIG. 17A, a suction cup 276A is disposed on an inner surface 223 of the alignment member 222. The suction cup 276A engages the inner surface 34 of the barrel 36 of the vehicle wheel 14 (FIG. 1) to facilitate securely retaining the wheel balancing tool 210 on the vehicle wheel. The suction cup 276A substantially prevents the wheel balancing tool 210 from accidentally disengaging the vehicle rim 12 (FIG. 1). Any other suitable retaining means can be used to facilitate securing the tool to the vehicle wheel, such as a magnet 276B as shown in FIG. 17B. The wheel balancing tool of any of the exemplary embodiments can be modified to include the retaining means described with reference to FIGS. 17A and 17B.

Figure 18:
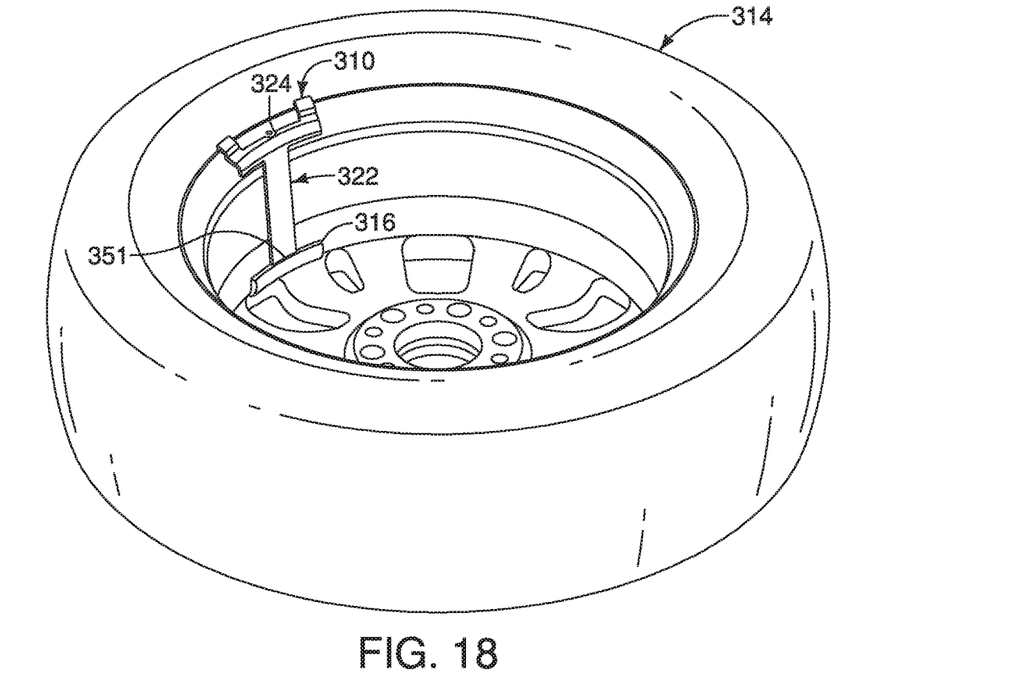
FIG. 18 is a perspective view of the wheel balancing tool of FIG. 4 including an alignment edge to facilitate positioning of the balancing weight.

As shown in FIG. 18, a wheel balancing tool 310 in accordance with another illustrated exemplary embodiment of the present invention is substantially similar to the wheel balancing tool 10 of the exemplary embodiment illustrated in FIGS. 1 to 8 except for the differences described below. Similar parts are identified with similar reference numerals, except increased by 300 (i.e., 3xx, accordingly).

The alignment member 322 extends in an axial direction of the vehicle wheel 314 to a position at which the balancing weight 316 is to be added to the vehicle wheel 314, as shown in FIG. 18. A free, laterally extending edge 351 of the alignment member 322 provides an edge against which the balancing weight 316 is configured to be contacted to ensure proper positioning of the balancing weight 316. The notch 324 is aligned with a center of the laterally extending edge 351 to indicate proper placement of the balancing weight 316. The wheel balancing tool of any of the exemplary embodiments can be modified to include the laterally extending edge 351 described with reference to FIG. 18.

Figure 19:
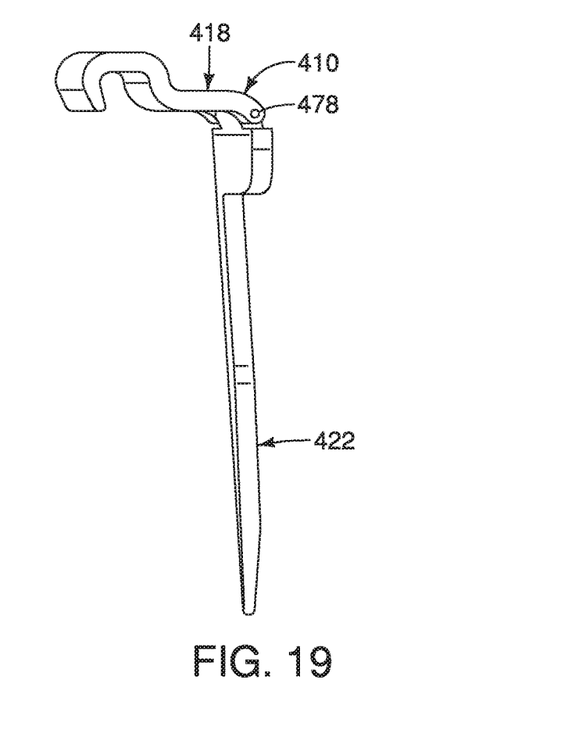
FIG. 19 is a side elevational view of the wheel balancing tool of FIG. 4 including a hinge to facilitate collapsing the wheel balancing tool for storage.

As shown in FIG. 19, a wheel balancing tool 410 in accordance with another illustrated exemplary embodiment of the present invention is substantially similar to the wheel balancing tool 10 of the exemplary embodiment illustrated in FIGS. 1 to 8 except for the differences described below. Similar parts are identified with similar reference numerals, except increased by 400 (i.e., 4xx, accordingly).

The wheel balancing tool 410 includes a hinge member 478, such as a piano hinge, to hingedly connect the body member 418 and the alignment member 422. The hinge member 478 allows the wheel balancing tool 410 to be stored in a substantially flat manner, thereby occupying less space and providing for easier storage. The wheel balancing tool of any of the exemplary embodiments can be modified to include the hinge member 478 described with reference to FIG. 19.

Figure 20:
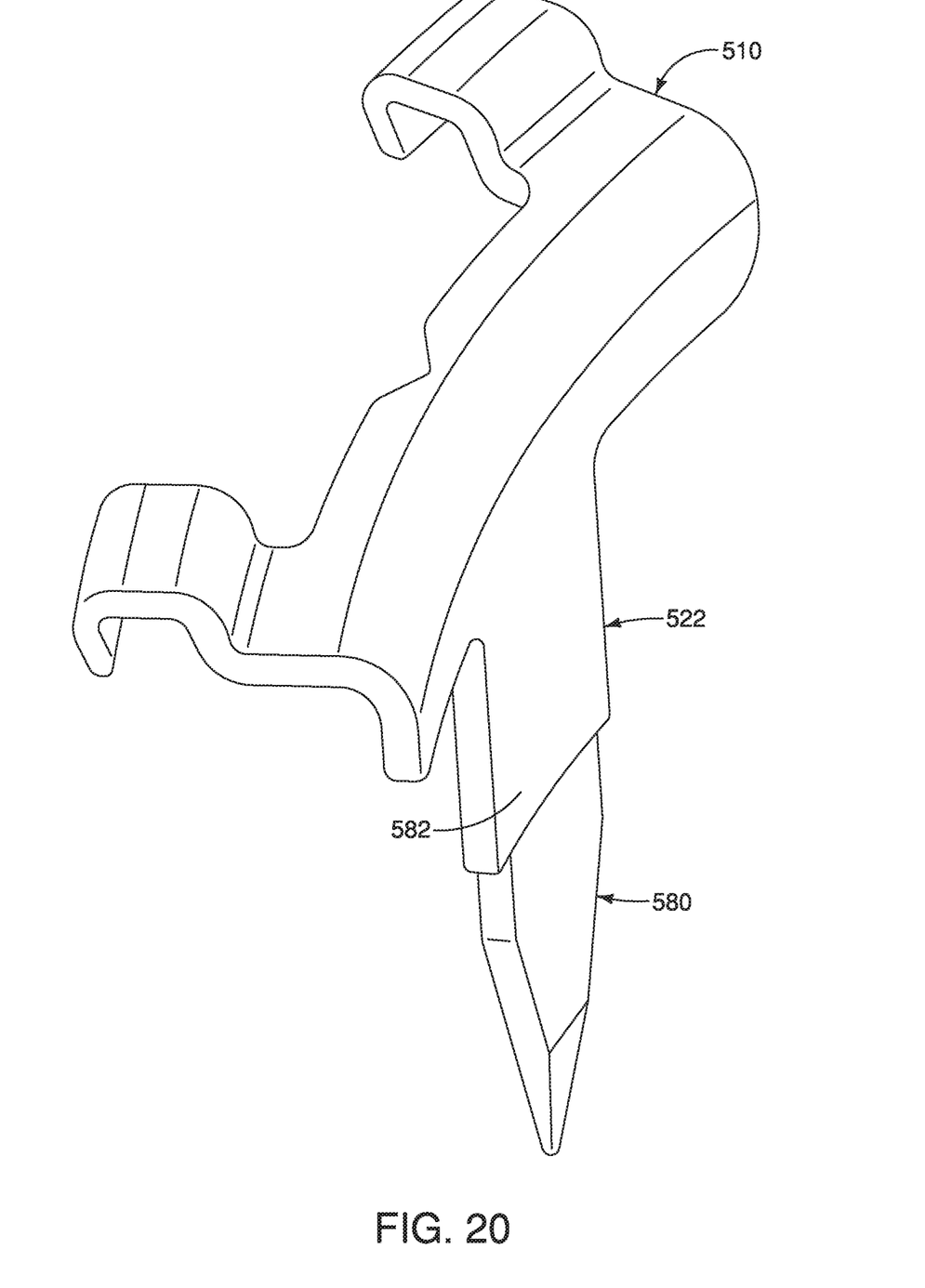
FIG. 20 is a perspective view of the wheel balancing tool of FIG. 3 including a telescoping alignment member to adjust a length of the alignment member.

As shown in FIG. 20, a wheel balancing tool 510 in accordance with another illustrated exemplary embodiment of the present invention is substantially similar to the wheel balancing tool 10 of the exemplary embodiment illustrated in FIGS. 1 to 8 except for the differences described below. Similar parts are identified with similar reference numerals, except increased by 500 (i.e., 5xx, accordingly).

The wheel balancing tool 510 includes an alignment member 522 having a telescoping portion 580, as shown in FIG. 20. A first portion 582 of the alignment member 582 has a hollow cavity that allows for movement of the telescoping portion 580 therein. An interior surface of the first portion 582 and an exterior surface of the telescoping portion 580 can include cooperating structure, such as notches and detents, that allow the telescoping portion 580 to be locked in a desired position, thereby allowing the wheel balancing tool 510 to be adjusted based on a size of the vehicle wheel being balanced. The wheel balancing tool of any of the exemplary embodiments can be modified to include the telescoping portion 580 described with reference to FIG. 20.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the wheel balancing tool. Accordingly, these terms, as utilized to describe the present invention should be interpreted relative to the wheel balancing tool.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A wheel balancing tool comprising:
    a body member including a notch configured to be aligned with a balancing mark on a rim of a vehicle wheel;
    an attachment member connected to the body member, the attachment member including at least one hook configured to attach the tool to the wheel rim; and
    an alignment member extending outwardly from the body portion and configured to indicate an attachment position on the wheel for a balancing weight, the alignment member tapering to a pointed tip to indicate the attachment position for the balancing weight, the pointed tip being a lowermost point of the wheel balancing tool and located away from the wheel rim.

2. The wheel balancing tool according to claim 1, wherein the tool is integrally formed as a one-piece member.

3. The wheel balancing tool according to claim 1, wherein the notch is formed in a first plane and the alignment member is formed in a second plane, the first plane and the plane being non-coplanar.

4. The wheel balancing tool according to claim 1, wherein the notch is aligned with the pointed tip of the alignment member.

5. The wheel balancing tool according to claim 1, wherein the alignment member has a free laterally extending edge against which the balancing weight is to be positioned.

6. The wheel balancing tool according to claim 1, wherein a magnet is disposed on the alignment member to facilitate securing the tool to the vehicle wheel.

7. The wheel balancing tool according to claim 1, wherein a suction cup is disposed on the alignment member to facilitate securing the tool to the vehicle wheel.

8. The wheel balancing tool according to claim 1, wherein the alignment member is hingedly connected to the body member.

9. The wheel balancing tool according to claim 1, wherein the alignment member includes a telescoping portion to adjust a length of the alignment member.

10. The wheel balancing tool according to claim 1, wherein the body member is curved to facilitate being positioned adjacent an inner surface of a barrel of the wheel.

11. The wheel balancing tool according to claim 1, wherein a first width of the body member is larger than a second width of the alignment member.

12. The wheel balancing tool according to claim 1, wherein the tool is made of plastic.

13. The wheel balancing tool according to claim 1, wherein the attachment member includes first and second hooks.

14. The wheel balancing tool according to claim 13, wherein the first and second hooks are spaced apart such that the notch is disposed between the first and second hooks.

15. The wheel balancing tool according to claim 13, wherein the first and second hooks are linearly offset when viewed from above the tool.

16. The wheel balancing tool according to claim 1, wherein the attachment member includes one hook connected to the body member by first and second arms.

17. The wheel balancing tool according to claim 16, wherein the hook is curved to facilitate connecting to the wheel rim.

18. The wheel balancing tool according to claim 16, wherein the first and second arms, the hook and the body member define an open space within which the balancing mark is configured to be positioned.

19. The wheel balancing tool according to claim 18, wherein the notch is disposed in a portion of the body member defining the open space.

\* \* \* \* \*